C. W. McKINLEY.
SHAFT BEARING PACKING.
APPLICATION FILED NOV. 5, 1917.
1,279,131.
Patented Sept. 17, 1918.
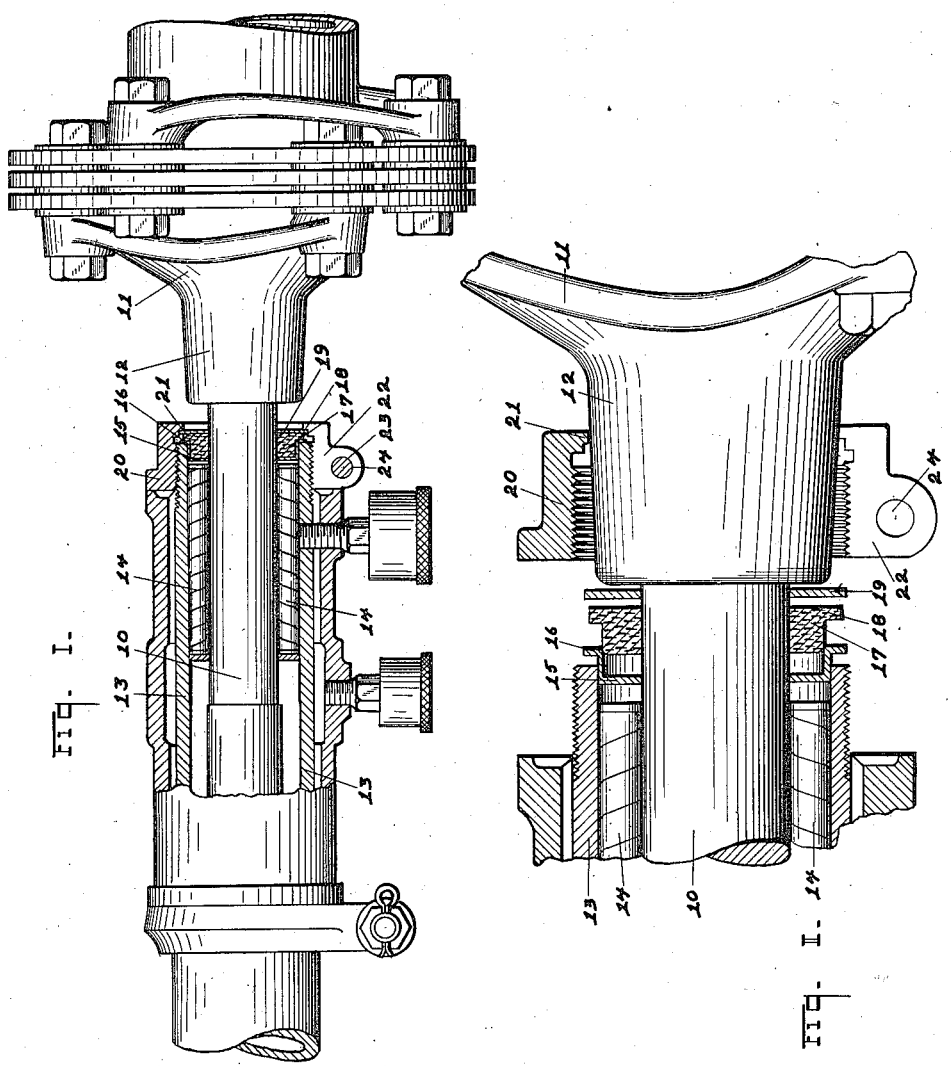
Inventor
Charles W. McKinley
By Chester H Braselton
Attorney

UNITED STATES PATENT OFFICE.

CHARLES W. McKINLEY, OF TOLEDO, OHIO, ASSIGNOR TO THE WILLYS-OVERLAND COMPANY, OF TOLEDO, OHIO, A CORPORATION OF OHIO.

SHAFT-BEARING PACKING.

1,279,131.

Specification of Letters Patent.  Patented Sept. 17, 1918.

Application filed November 5, 1917.  Serial No. 200,359.

*To all whom it may concern:*

Be it known that I, CHARLES W. McKIN-LEY, a citizen of the United States, residing at Toledo, in the county of Lucas and State of Ohio, have invented certain new and useful Improvements in Shaft-Bearing Packing, of which I declare the following to be a full, clear, and exact description.

This invention relates to improvements in packing for propeller shaft bearings.

The principal object of this invention is to provide an improved arrangement for holding the packing used in connection with the bearings for a propeller shaft, so as to prevent the packing jamming the bearing and so as to facilitate the removal of the packing in case replacement is necessary.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which—

Figure I is a view, partly in section and partly in side elevation, of a propeller shaft and casing showing my packing arrangement embodied therein.

Fig. II is an enlarged, detail, sectional view, similar to a part of Fig. I, but showing the parts of the packing carrier separated, so as to permit the removal of the packing.

In the drawings, similar reference numerals refer to similar parts throughout the several views.

Considering the numbered parts of the drawing, I have shown a propeller shaft 10 connected at its forward end to the hub 12 of the universal joint 11. The propeller shaft 10 is housed within the propeller shaft casing 13, and the roller bearing 14 is disposed between the end of the casing 13 and the propeller shaft 10, a short distance in the rear of the hub 12 of the universal joint.

A cup-shaped ring 15 is provided, which fits into the end of the casing 13, around the shaft 10, said ring being provided with an annular projecting flange 16, which engages the end of the casing 13, as clearly shown in the drawing. The packing ring 17 is provided, which fits within the cup-shaped ring 15, and has a projecting portion 18, adapted to engage the flange 16 of the cup-shaped ring 15. A ring or washer 19 is provided, which engages the forward surface of the packing 18. A split ring 20 is threaded upon the end of the casing 13 and provided with a laterally projecting flange 21, which is adapted to engage the edge of the washer 19, so as to clamp the rings 16 and 19 and the packing ring 17 in place relative to the end of the casing 13. The ring 20 is split at 22 and clamped in position by means of a bolt 23, passing through the openings 24.

From the description of the parts given above, the operation of this device should be very readily understood. The depth of the cup-shaped ring 15 is such that the flange 16, which abuts the end of the casing 13, holds the bottom of the cup-shaped ring 15 away from the end of the bearing 14, and as the packing ring 17 is carried by the cup-shaped ring 15 there is no chance for the packing jamming the end of the bearing and preventing the rotation of the rollers, as the packing ring 17 is held by and securely clamped in place and positioned relative to the casing 13 by the rings 15 and 19, between which it is clamped by the ring 20, threaded on the end of the casing 13. The opening in the ring 20 is made large enough, so that the ring can slip over the hub 12 of the universal joint 11, as shown in Fig. II of the drawing. This is possible because the washer 19 serves to clamp the packing ring 17 in place, and only the extreme periphery of the washer 19 is engaged by the flange 21 of the ring 20. By this means, it is possible to move the ring 20 back over the hub of the universal joint, and the washer 19 can be moved up close to the hub 12, so that the packing ring 17 can be removed without disconnecting the universal joint, it being merely necessary to move back the washer 19, and to move out the packing ring 17, until it is accessible between the washer 19 and the end of the casing 13.

It will be seen that in this arrangement for carrying the packing ring, which I have here shown and described, I have provided a packing for a propeller shaft bearing, which renders it impossible for the packing to jam the bearing, and which makes it possible for the repairman to very readily gain access to the packing ring, so as to replace it in case it has become worn.

I am aware that the particular embodiment of my invention, which I have here shown and described, is susceptible of considerable variation without departing from the spirit thereof, and, therefore, I desire to claim my invention broadly, as well as specifically, as indicated by the appended claims.

Having thus described my invention, what I claim as new and desire to secure by Letters Patent, is:

1. A device of the class described, comprising the combination of a casing; a shaft disposed therein; a bearing mounted within said casing between said shaft and said casing; a cup-shaped ring disposed in said casing and provided with a peripheral flange engaging the end of said casing; a packing ring disposed in said cup-shaped ring around the shaft and provided with a portion engaging the peripheral flange of said cup-shaped ring; a washer engaging the opposite surface of said packing ring; and a ring threaded on the end of said casing and provided with a flange engaging the periphery of said washer, to clamp said packing ring in place in said casing.

2. A device of the class described, comprising the combination of a casing; a shaft disposed in said casing; a bearing mounted around said shaft and between said shaft and said casing; a cup-shaped ring disposed in the end of said casing, and spaced from the end of said bearing; a packing ring mounted in said cup-shaped ring; a washer engaging the other surface of said packing ring; and a ring threaded on the end of said casing and provided with a peripheral flange engaging the periphery of said washer, to clamp said packing ring in place in said casing.

3. A device of the class described, comprising the combination of a shaft; a casing; a bearing disposed around said shaft and within said casing; a cup-shaped ring mounted in the end of said casing and spaced from the end of said bearing; a packing ring carried by said cup-shaped ring; and means threaded on the end of said casing for retaining said packing ring in place.

4. A device of the class described, comprising the combination of a shaft with one end connected to the hub of a universal joint; a casing in which said shaft is mounted; a bearing around said shaft and within said casing; a cup-shaped ring mounted in the end of said casing; a packing ring mounted in said cup-shaped ring; and a ring threaded on the end of said casing and engaging said packing ring to clamp the same in place in said casing, said cup-shaped ring being provided with an opening of larger diameter than the hub of said universal joint, whereby said ring may be moved back over the hub of said universal joint to release the packing.

In testimony whereof I affix my signature.

CHARLES W. McKINLEY.